INVENTORS
HARRY M. ANDERSEN
JOHN M. CALFEE

BY *Robert Hartenberger*

ATTORNEY

United States Patent Office 3,658,748
Patented Apr. 25, 1972

3,658,748
MOLDING COMPOSITION AND METHOD
Harry M. Andersen, Ballwin, and John D. Calfee, St. Louis, Mo., assignors to Monsanto Company, St. Louis, Mo.
Original application Sept. 5, 1967, Ser. No. 665,536. Divided and this application Mar. 9, 1970, Ser. No. 22,723
Int. Cl. C08g 51/10
U.S. Cl. 260—37 EP          11 Claims

ABSTRACT OF THE DISCLOSURE

A molding composition comprising grains each containing a plurality of reinforcing fibers in parallel arrangement and embedded in and bonded together by a thermosettable resin which also envelopes said plurality of bonded fibers; the method of preparing the composition by contacting an aqueous slurry of the fibers with a liquid, thermosettable resin and a curing agent therefor, advancing the resin to a solid, fusible stage, and recovering said composition from the resulting reaction mixture; the heat-curable extrudate obtained from said composition, and the method of preparing the extrudate.

---

Figure 1:

This application is a division of applicants' copending application Ser. No. 665,536 filed Sept. 5, 1967.

BACKGROUND OF THE INVENTION (1) Field of the invention

Thermosettable, fiber-reinforced, resinous molding composition.

(2) Background of the invention

In the manufacture of molded, resinous products, fibrous materials have been incorporated as filler reinforcing means, and a parallel, rather than a heterogenous, disposition of the fibers in the resin matrix is known to result in improved strength and modulus. Any desired arrangement in compression molding can be attained by hand lay-up or by the use of mats or other prepregs in which the fiber has been firmly positioned before molding. In order to introduce a filler into a flow-molded object, there has been employed either a fluid or dry mix of resin and filler, or small pieces of solid, fusible resin in which the filler has been embedded.

For the thermoplastic art, there have been provided moldable capsules wherein a finely divided particulate material is encased by the resin. See U.S. Pat. Nos. 3,185,589, 3,265,644, 3,256,236, and British Pat. Nos. 859,696 and 929,102. Such capsules consist of individual particles or fibers or a bundle of non-bonded fibers upon which an addition monomer has been polymerized. Products wherein a uniform shell of a polyamide has been deposited on each fiber or particle are disclosed in U.S. Pat. No. 3272,897. Although use of such capsules in flow molding facilitates dispersion of the fibrous filler, it does little to assure orientation of a fibrous filler, because during flow each coating fiber or each bundle of adjacent, unbonded fibers becomes randomly disposed. Accordingly, the art has provided fiber-filled, resinous particles or rodlets formed by chopping long strands or ribbons comprising filaments which are embedded in the resin in parallel arrangement. See U.S. Pat. Nos. 2,877,501, 3,119,718, 3,249,411, 3,214,324, 3,305,417, 3,220,905, 2,931,739, and 3,158,519. Assurance of filament orientation in strands or ribbons requires mechanical alignment of filaments as they are passed through and taken up from an impregnating bath and dried. When the dry elongated material is chopped into small pieces; e.g., rodlets, in case of strands, the chopped product has ends which are frequently frayed or jagged; and, of course, there is no coating of resin on the ends. Moreover, it is difficult to chop the prepregged roving into very small lengths. The uncoated, uneven ends pick up moisture readily, particularly if they are siliceous. This may disrupt the resin to fiber bond. Where pressure of any degree is used in molding, the raw ends are often caused to protrude through the surface of the molded object. In flow molding, such ends impede proper flow through mold gates or channels. Moreover, there occurs redistribution of the fibers owing to the difficulty in flow, so that, even though the fibers in the moldable rodlets are collimated, such alignment does not continue in the molded object for the maximum desired effect.

On the other hand, when short fibers are coated with a thermosettable resin by conventional means; e.g., by treating them with a solution of the resin or melt, there are formed clumps, rather than grains. See, e.g., U.S. Pat. No. 3,184,368 wherein the clumps are broken up in a hopper by being forced against a coarse screen by a rotating brush operating at the bottom of the hopper.

The present invention overcomes these and other difficulties. Tedious manipulation of spaced, continuous fibers is not required; the presently provided granular product contains a plurality of oriented fibers separated from each other by a resin which assures against fracture and provides for retention of the oriented condition; the present grains have no uncoated, raw ends as do the prior art chopped strands or ribbons; and flow-molding of the present grains is readily conducted. The invention makes possible high volume percent loadings of short fibers in extrusion operations. Moreover, extrudates obtained from the grains are characterized by the high degree of fiber alignment made possible by the smooth flow of the grains. When extrusion is so conducted that the thermal history of the resin is less than required for complete cure, the extrudate forms an excellent prepreg for compression molding because maximum orinetation and overlap are present.

SUMMARY OF THE INVENTION

The object of this invention is to provide an improved, fiber-containing, thermosettable prepreg granule for use in fabrication of high performance composites. Another object is the provision of a fiber-containing granular molding composition which can be extruded into a prepreg strand having a maximum degree of fiber orientation. A most important objective is to provide a thermosettable, fiber-filled prepreg which can be flow molded to give a shaped object having very high strength and modulus.

These and other objects hereinafter disclosed are provided by the invention wherein there is provided a new and valuable molding composition comprising grains, each containing a plurality of fibers bonded to each other in substantially parallel arrangement by a thermosettable resin to form an integral unit which is completely enveloped by said resin.

A significant feature of the invention is the provision, by extrusion, of a prepreg strand wherein noncontinuous, reinforcing fibers are aligned lengthwise of the strand.

Also provided by the invention is a method of preparing the new composition, which method comprises preparing an aqueous slurry of short, discontinuous fibers, stirring into the slurry a thermosettable resin and a curing agent therefor at a temperature at which the resin is liquid, continuing the stirring to advance the resin to the B stage, rapidly cooling the resulting slurry, removing the water, and drying to obtain discrete grains of the fiber-filled resin.

An important embodiment of the invention is the inclusion in said slurry, of finely comminuted filler as a collimating aid for said fibers, said filler being present in from 0% to about 40% by volume of total filler.

Figure 2:
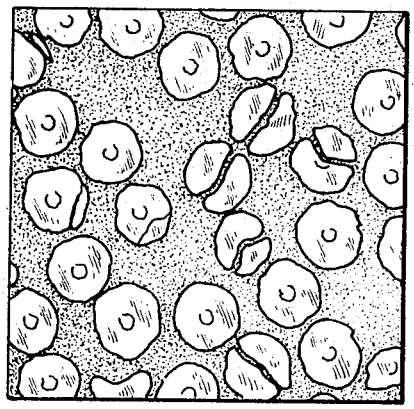
Figure 3:
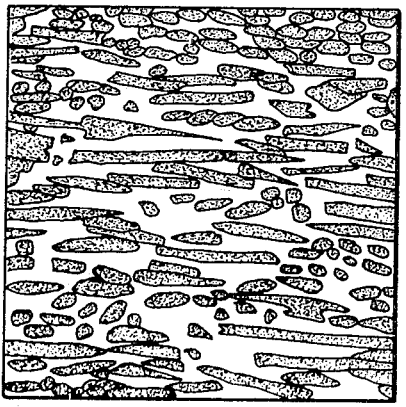

The grains have a noteworthy structure. Starting with short, loose fibers, grains are obtained in which a plurality of individual fibers is uniformly embedded in the B staged resin in a collimated array. Grain length is roughly one to two times the original fiber length; grain diameter usually is roughly half the fiber length. Depending upon the nature of the fibers and the dimensions thereof, grain shape varies from slim and pointed through elongated ellipsoids to nearly perfect right cylinders or skewed cylinders. Reference is made to the drawings, wherein FIG. 1 is a photograph of a microscope view of some of the grains, FIG. 2 is a photomicrograph of a cross section of a grain, clearly showing substantially parallel alignment of the reinforcing fiber and interstitial resin therebetween, and FIG. 3 is a photomicrograph of a longitudinal section of the molded composite showing unidirectional disposition, close packing, and overlapping of the fibers.

A mixture of fibers may be used in making the grains. This is often desirable when employing the difficultly available fibers or whiskers; e.g., there may be used a mixture of glass fiber with boron fiber or with silicon carbide or silicon nitride whiskers.

The length of the fibers should be short enough to produce flowable grains; these should be extrudable through conventional channels or capable of being flowed in transfer molding through narrow gates. Generally, the fibers should have a length of from, say, 0.01 to 1.0 inch, and preferably of from 0.03 to 0.5 inch. The ratio of length to diameter; i.e., the aspect ratio ($L/D$) may vary from less than 20 to 1000 or more. However, with most reinforcing fibers, good collimation is obtained and there is little or no tendency for the fibers to felt or haystack in the aqueous medium when the fiber has an aspect ratio of, say, from 40 to 1000. In general, the higher the modulus, the higher the optimum aspect ratio for processing. Any type of reinforcing fiber may be employed; however, glass, metal and refractory materials, generally, in filament or whisker form, are preferred.

The thermosettable resin may be any resin which is liquid at a certain temperature and which hardens upon being cured, first to a fusible and then to an infusible stage; e.g., the resin which is added to the aqueous slurry of fiber may be a liquid, A stage epoxy, polyester, phenolic, amine, amide or urethane type resin.

Depending upon the type of fiber and resin employed, a coupling agent may or may not be used.

The process requires that the fibers be suspended in the water in order to maintain a slurry. This can be effected by stirring, either in the absence or presence of a surfactant.

The temperature at which the reaction is conducted will depend upon the resin. For proper reaction to occur, the A stage resin should be in the liquid state. In order to assure this, the slurry and resin are usually warmed separately, say at from 50° to 100° C. before they are mixed together. Advancement of the resin to the B stage in presence of the curing agent is then conducted at the temperature at which such change is known to occur. With the epoxy and polyester resins, advancement to the B stage can generally be brought about at the temperature at which the resin is added to the slurry. Stirring of the mixture is simply conducted until attainment of the B stage.

The grains may be compressed or transfer molded directly, employing the temperature which is known to advance the particular B stage resin to the C or infusible stage.

The grains may also be extrusion molded to give an extrudate which is still in the B stage by extruding through a constricted channel or orifice which is maintained at conditions such that C-staging does not occur. When extrusion is conducted through an orifice of any desired cross-section, there is obtained a continuous strand in which the fiber is disposed lengthwise in substantially parallel array. Compression molding of the strand gives composites of high strength and modulus. For example, with ⅛ inch glass fiber and epoxy resin there is thus obtained a test specimen having a flexural strength of 94,000 p.s.i. and flexural modulus of 4,200,000 p.s.i. With a boron-tungsten fiber of the same length, the epoxy composite obtained by compression molding the grains directly, has a flexural strength of 66,000 p.s.i. and flexural modulus of 14,900,000 p.s.i. These values are increased to 75,000 p.s.i. and 16,700,00 p.s.i., respectively, by first extruding the grains to the B stage strand and then compression molding the extrudate. The presently provided grains and the extrudates obtained therefrom, wherein the fibers are unidirectional, thus provide a significant advance in the field of high-strength composite fabrication.

FIGURES

In the accompanying drawings:

FIG. 1 is a photograph showing an example of the grains in the molding composition of the present invention, the grains comprising approximately 30% by volume boron fibers and approximately 10% by volume of attapulgus in an epoxy resin matrix, FIG. 2 is a photomicrograph showing a cross section of one of the grains of the composition in FIG. 1, and showing the collimations of the fibers in the grain, the epoxy resin matrix filling the voids between the fibers.

FIG. 3 is a photomicrograph of a longitudinal section of a composite structure which is made by transfer molding of the grains and showing the orientation of the short glass fibers employed.

DESCRIPTION OF THE PREFERRED EMBODIMENTS

The grains of this invention are proferably made by slurrying short; i.e., about 0.03 to 1.0 inch, reinforcing fibers in water, stirring into the slurry a theromsettable resin and a curing agent therefor, at a temperature at which the resin is liquid, stirring the resulting mixture until the resin is advanced to the B stage, rapidly cooling the resulting mixture, decanting water from the cooled mixture, washing the residual solids, and drying the washed solids.

When added to the aqueous slurry of fiber, the thermosettable resin should be liquid and be capable of advancing beyond the liquid stage to a stage where it is solid, but still not infusible. The liquid stage is generally referred to in the art as the A stage, and this in-between stage is called the B stage. The final, infusible stage is the C stage. In this invention, the resin when added to the slurry is in the A stage. The molding grain is in the B stage. It is also in the B stage in an extrudate obtained by working below a time-temperature integral at which it would be cured to the C stage. The various thermosettable liquid resins require different temperatures and times for advancing from one stage to the next.

Of particular utility in the present invention are the epoxide resins. As herein employed, the term include any resinous material containing the grouping

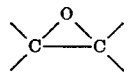

As is well known in the art, the liquid, A stage epoxide resins are generally prepared by reacting polyhydroxy compounds with chlorohydrins and/or polyepoxides or mixtures thereof. Examples of commonly available epoxy resins are those made from epichlorohydrin and such polyhydroxy compounds as 4,4'-isopropylidenebisphenol, resorcinol, ethylene glycol, phenol-aldehyde precondensates, generally, such as the Novolacs, etc. Examples of presently useful resins which are commercially available are the "Epons" which are manufactured by Shell Chemical Company and the "Araldites" which are manufactured by Ciba Company. The epoxide resins are generally characterized by the term "epoxide equivalent weight" which term indicates the weight of the resin that is equivalent to one epoxide group. Particularly suitable for the present purpose are those resins which have epoxide equivalents between about 140 and about 500; e.g., Epon 828 or 834, or 1064 or 1031 or 1001 and Araldite 1064 or 6020. These materials are generally liquids at temperatures of from 9–80° C. and are in the A stage of polymerization.

In order to advance the polymerization to the B stage, whereby the A stage resins become fusible solids, the A stage resins are reacted with a curing agent at a temperature and time insufficient to give complete cure. This agent may be any material which reacts by cross-linking with the polyepoxides; e.g., the polycarboxylic acids and anhydrides, polyamines, polymercaptans, boron - trifluoride complexes, hydrazides, polyamides, low molecular weight phenol/formaldehyde, urea/formaldehyde or melamine/formaldehyde resins, etc. Particularly preferred are compounds containing a plurality of amino hydrogen atoms; e.g., diethylenetriamine, triethylenetetramine, melamine, dicyandiamide, m-phenylenediamine, methylenedianiline, diaminodiphenyl sulfone, etc. As is known in the art, the curing agent should be used in a quantity which is at least 1.1 times the chemical equivalent amount of the liquid epoxide resin. By "chemical equivalent" amount is meant the quantity of curing agent needed to furnish one neutralizable hydrogen per epoxy group.

For some purposes, in order to obtain products meeting certain specificatiions, it may be desirable to use a mixture of two or more liquid epoxide resins and/or a mixture of two or more curing agents.

Instead of employing the epoxides, other thermosettable liquid resins may be used; e.g., the unsaturated polyester resins which can be crosslinked with an olefinic compound; e.g., the reaction product of an alpha, beta-unsaturated acid or anhydride such as fumaric acid or maleic anhydride or a mixture of such an unsaturated acid compound and a saturated polycarboxy compound such as adipic acid or phthalic anhydride, with a polyvalent alcohol such as ethylene- or diethylene glycol. See, for example the book "Unsaturated Polyesters, Structures and Properties," by H. V. Boenig, New York, Elsevier Publishing Company, 1964. The unsaturated polyesters dissolve easily in styrene or other vinyl compounds; e.g., vinyl acetate or ethyl acrylate to give syrups which polymerize in the presence of a free radical liberating agent to give first a solid fusible resin and subsequently upon heating at increased temperature, a solid, infusible product. The purpose of the polymerization catalyst is to cause completion of the polymerization to the final stage; e.g., the C stage, whereby the resin becomes infusible. The catalyst is generally one which will have no activity with the first change of the syrup to the solid, fusible B stage, and is used only to facilitate polymerization of the resin at the final working of either the fiber-filled grain or the extrudate prepared therefrom according to the invention.

Instead of the preferred polyepoxides there may likewise be used the liquid, thermosettable phenolic resins; e.g., the phenol/formaldehyde, phenol/furfural or the xylenol/formaldehyde resins. Other aldehyde-derived resins such as the cureable urea/formaldehyde and the melamine/formaldehyde resins are also useful.

Other thermosettable resins which are presently useful are the polyurethane-forming precondensates, the polyamides, the aromatic polyimides, the polybenzimidazoles, etc.

The preferred fibers for use in this invention are any fibers which have a reinforcing effect when present in a molded composite. The term "fiber" as used herein, includes filaments and whiskers of any cross-sectional shape, solid or hollow. They may be inorganic or organic, depending upon the intended use of the molded articles which are prepared from the granules. Since they are inclosed in a granule which is to be flow-molded, they will be short fibers; e.g., they will be from, say, 0.002" to 1.0" and preferably from about 0.03" to 0.5", in length.

Preferably, the fiber will have an aspect ratio of from about 100 to 1000, although, depending upon the nature of the fiber the diameter may be lower or greater than that required by such a range. In selecting the most suitable ratio within these limits it is advantageous to consider the stiffness of the contemplated reinforcing fiber, since materials of high flexibility should be thick enough to maintain a degree of rigidity in the aqueous medium. Likewise, materials of great rigidity should be thin enough to permit aligning or "pushing" of the fiber by the liquid resin and, possibly, inorganic pigment or auxiliary, finely comminuted filler. One skilled in the art, being given the present disclosure, can select the proper aspect ratio for each fiber as a matter of routine experimentation: when the aspect ratio is too high for the kind of fiber employed, felting may occur because at such aspect ratio that particular fiber is too weak to resist the "pushing" effect of the resin; hence, a shorter fiber of the same diameter should be used. When the aspect ratio is too low for the kind of fiber employed, the fibers will arrange themselves into a haystack formation because at such aspect ratio that particular fiber is so stiff that it resists said "pushing" effect; hence a longer fiber of the same diameter should be employed.

The fiber may be inorganic or organic, so long as it can be slurried in water and possesses reinforcing property. Glass fibers, being readily available and imparting very good tensile and flexural properties to composite structures, are generally useful; and for purposes of comparison in evaluating such factors as presence or absence of surface-active agent, use of an interstice-filling agent such as clay, effect of fiber length, etc., many of the following examples show the use of glass fiber. However, from the standpoint of simultaneous mechanical strength and thermal resistance, particularly useful are short fiber filaments or whiskers of boron, graphite, carbon niobium, tantalum, hafnium, tungsten, molybdenum, bronze, copper, lead, beryllium silver, stainless steel, silica, silicon nitride, alumina, sapphire, zirconia, titania, etc. Any of the high-strength fibers listed in the table at page 134 of the book "Fiber Composite Materials," published by the American Society for Metals, Metals Park, Ohio, 1965, is presently useful. Naturally occurring fibers such as the comparatively long asbestos fibers; e.g., crocidolite or chrysotile, or hemp and bamboo fibers are also useful. Examples of presently commercially available fibers which are advantageously employed in the present grain structures as reinforcing agents are the milled alumina-silica fibers of the type supplied under the name "Fiberfax 100," the potassium titanate fibers of the type supplied under the name "Tipersul," the "Thornel" graphite fibers, etc.

Synthetic, high strength organic fibers of present utility include the nylon, the polyacrylonitrile, the polypropylene and the polyester fibers.

Mixtures of fibers may be used; e.g., there may be present in the grain, fibers of, say, graphite and fibers of say, silica. Glass fibers are advantageously used with nylon fibers. Also, the fibers need not be of uniform length; i.e., fibers graded to a range of lengths or screened to pass a mesh size may be used. Mixtures wherein as high as 90% of the total volume of fiber has a length of less than 0.03 inch still give grains wherein the longer fibers are collimated.

Surprisingly, in many cases improved collimation results from using a mixture of fibers which contains as much as about 40% by volume of fiber having a length of less than about 0.03 inch, generally less than 0.01 inch. This may be due to reinforcement of the interstitial resin between the longer fibers by the occluded, extremely short fiber. Thereby, collimation of both lengths of fiber is improved; i.e., the extremely short fiber serves as an over-all collimation end. The different lengths of fiber need not be of the same material. Thus, the total filler may consist of a collimation aid of say, crushed glass wool or fibrous clay with reinforcing fibers of say, glass. Particularly significant is the collimating efficiency of e.g., extremely short asbestos fiber or fibrous clay for reinforcing boron fiber.

Collimating effect is also obtained by using dusts or powders, instead of the relatively short fibers. Finely comminuted materials such as clay, talcum, lampblack, rutile titania, silica, silicon carbide, etc., is readily taken up by the liquid resin. When very rigid fibers are present, the resulting, heavy resin-powder mixture is able to "push" the rigid fiber into position mixture more easily than can the powder-free resin. Hence with certain reinforcing fibers; e.g., the relatively thick, high-modulus stainless steel fibers, the fine, particulated fillers or pigments are especially useful.

Generally a particulate filler, whether in fiber, dust or powder form, and having a maximum linear dimension of less than 0.03 inch and, preferably, less than 0.01 inch, aids in collimation of the reinforcing fiber when present in a quantity which is from 0.5% to 40% and, preferably, from about 2% to 30% by volume of total filler.

The collimation aid may be so chosen as to impart special properties to molded composites obtained from grains in which it is present. Thus, depending upon the nature of the collimation aid, there may result an increase in hardness or a decrease in shrinkage. Also, the collimation aids may be such that they produce intrinsic effects; e.g., they may be electricity conductors or heat insulators, electricity insulators, etc. For example, radiation shielding properties are thus incorporated by including powdered lead into the grains, together with the reinforcing fibers.

As is known in the art, bonding of resin to filler is often facilitated by use of a coupling or anchoring agent. Such an agent is usually a bifunctional compound having a reactive group which reacts or is otherwise attached; e.g., by hydrogen bonding, to the filler, and another reactive group which reacts with or is somehow attached to the resin matrix. With some fillers, a coupling agent serves no purpose and may even hinder bonding; with others a bonding agent is recommended. In practice, glass fibers are generally coated with a protective coating immediately upon spinning. Such coatings may prevent satisfactory resin to glass bonding, and cleaning of the fiber by heating it to burn off the coating is frequently resorted to. In other instances, the glass fiber, as received, is simply treated with a material which is known to facilitate bonding. For purposes of comparison, in the working examples which follow, the same coupling agent was used in order to limit operating variables which might prevent the obtaining of meaningful data. The coupling agent of the working examples is y-aminopropyltriethoxysilane, a presently readily available commercial agent of the family of silane couplers. Other aminoalkylalkoxysilanes which may be used as well as similar silanes are disclosed in U.S. Pat. No. 2,832,754, the teachings of which are herein incorporated by reference, and (aminobutyl)methyldiethoxysilane and similar mixed alkylalkoxy silanes produced as shown in U.S. Pat. No. 2,930,809, the disclosure of which is likewise incorporated herein by reference. The polymers obtained from the hydrolysis products of such silanes, which polymers are disclosed in U.S. Pat. No. 3,045,036 are likewise useful. Also useful as coupling agents are the unsaturated organosilicon compounds such as those disclosed in U.S. Pat. No. 2,563,288, e.g., diallyldiethoxysilane. Other coupling agents which may be used in the present invention are the Werner type complex compounds; i.e. compounds in which a trivalent nuclear atom, such as chromium, is coordinated with an organic acid such as methacrylatochromic chloride or other compounds of this type which are described in U.S. Pat. No. 2,552,910. However, use of a coupling agent with a particular fiber or a particular thermosettable resins forms no critical feature of this invention, since the art fully recognizes the bonding propensity of the various thermosetting resins with the various reinforcing fillers, numerous coupling agents are available, and it involves only routine experimentation to determine whether a coupling agent is necessary to obtain the grains and to select a suitable one if reaction between the resin and the filler does not occur under the otherwise necessary conditions: slurrying in water, addition of the liquid resin and curing agent, warming at a temperature sufficient to B-stage the resin and insufficient to C-stage said resin, and rapidly cooling the resulting reaction mixture.

Also known to the art is the fact that while some fillers are readily slurried in water, others do not suspend readily or may require a surfactant to cause the resin to wet-out the fiber. As is evident from the working examples which follows, a surfactant is not generally required. However, when one is used, it is preferred to employ a cationic or non-ionic agent. The commercially available cationic agents are usually long-chained aliphatic amines or ammonium compounds which dissociate in aqueous systems to provide a positive radical containing more than 10 carbon atoms, e.g., alkylamines such as hexadecylamine and salts thereof, the alkyl quaternary ammonium compounds such as trimethyl stearyl or cetyl ammonium bromides and chlorides.

Examples of presently useful non-ionic agents included the polyoxyalkylene derivatives of fatty alcohols, fatty acids or fatty amides, e.g., the polyethyleneoxy compounds derived from sorbitol fatty acid ester such as polyoxyethylene sorbitan monopalmitate (Tween 40), or polyoxyethylenepolyoxypropylene compounds derived from polybasic carboxylic acids, e.g., Pluronic F68. Also useful are the alkylene oxide condensation produtcs of dimerized fatty acid alkylol amides of the type described in U.S. Pat. No. 2,470,087, and marketed as "Aerotex," or the ethylene oxide condensate of hydrogenated tallow acid amide known as "Ethomid HT/15." Examples of other nonionic agents are the long chained alkanolamines.

Wtih most fibers, the anionic surfactants, e.g., long-chained sulfates and sulfonates will not be found so useful as those of the cationic or non-ionic type. In many instances depending upon the extent of agitation, and the nature of the fiber, it will be found that adequate suspension and wetting-out can be achieved without the use of a dispersing or emulsifying agent. However, when the use of such an agent is indicated by rapid settling and someitmes even felting of the small fibers or non-wetting of the fibers by resin, the present examples of useful agents plus those provided in such books as "Detergents and Emulsifiers Annual," John W. McCutcheon, Inc., Morristown, N.J., 1966, will be properly informative.

The process requires that the fibers be slurried in water and that the resin and curing agent be stirred into the slurry. Accordingly, enough water should be used to permit suspension of the fibers and to permit stirring of the resulting suspension or slurry. Generally the fibers will be present in the aqueous slurry in an amount which is from, say 0.05% to 10%, and preferably from 0.1% to 5% by volume of the slurry before adding the resin and curing agent. A large excess of water may be used, of course. The resin should be used in an amount sufficient to coat and bond the fibers and to envelope each bonded unit. Generally, from 25% to 80% and preferably from 30% to 65% by volume of fiber based on the total of resin plus fiber is recommended. Grains having a high loading of the discontinuous fiber are thus readily obtained.

The temperature at which the resin is added should be such that the resin is liquid. This will vary, of course, with the nature of the resin. However, in order to assure that a fluid reaction mixture results upon contact of the resin with the water, it is advantageous to warm the aqueous slurry and the resin before adding the resin to the slurry. Accordingly, it is recommended that the slurry and the resin be separately warmed, say to from about 50° C. to about 100° C., and preferably to from about 60° C. to 80° C., and that the warm resin be stirred into the warm slurry. The curing agent is generally added to the warm, stirred aqueous mixture of liquid resin and fiber.

However, the order in which these materials are introduced into the slurry of fiber is not critical; for example, the liquid resin and the curing agent may be premixed just before addition to the slurry.

When a coupling agent is used, it is preferably added to the slurry before the resin and curing agent, in order to provide a properly reactive fiber. Whether warming is required for reaction to occur between the fibers and the coupling agent will depend upon the nature of the fibers and of the coupling agent. Because the slurry of fibers plus coupling agent is warmed before adding the other components, it is convenient to warm the slurry also before adding the coupling agent. Contrary to general practice, the fiber need not be dried after being treated with the coupling agent and before treatment with the resin. The latter may simply be added to the aqueous slurry to which the coupling agent had been added.

When a surfactant is used, it is for the purpose of facilitating suspension of the fibers. Hence, it is generally added to the water before introducing the fibers. The surfactant, when used, is usually employed in an amount of from say, about 0.02% to 2.0% based on the weight of the water.

After the liquid resin and the curing agent have been added, stirring is continued under temperature conditions which do not advance the resin to the infusible C stage but does permit advancement to the B stage. Usually this will be done by simply maintaining the temperature at which the reactants had been added to the slurry. After decanting the water and washing of the residue (if necessary), the washed product is allowed to air-dry. At this point, grains are already formed. Hence, except to speed up the drying, no spreading out of the product is required; it is simply a matter of removing the water or other washing agent. Air-drying at ordinary temperature and pressure is generally used; however, the drying may be expedited, of course, by employing heat and/or vacuum.

The dried granules may be compression or transfer molded directly by conventional means; post-curing may be used to develop maximum properties. Optimum orientation of fiber in the final molded product is often obtained by first extruding the grains through a constricted channel to obtain a prepreg strand having a high volume percent loading (up to 80%) of the reinforcing fiber aligned along the length of the strand. In order to permit subsequent molding, the extrusion should be conducted, of course, at a temperature which permits easy flow but is insufficient to advance the resin to the C stage in the time involved. The extrusion temperature will thus vary with the nature of the resin; for most epoxide resins, a temperature of say, from 100° to 150° C is satisfactory.

The invention is further illustrated by, but not limited to, the following examples:

EXAMPLE 1

This example shows preparation and evaluation of a granular molding composition having a 50% by volume content of glass fiber. The following materials were used:

| | G. |
|---|---|
| Epon 828 | 49.9 |
| 4,4'-methylenedianiline(MDA) | 14.9 |
| Glass fiber, ⅛" lengths | 135.2 |
| A–1100 coupler | 1.35 |
| Water, 6000 ml. | |

Epon 828 is a liquid epoxy resin manufactured by Shell Chemical Company, having an epoxide equivalent of 190–210, an approximate weight of 10.27 lbs./gallon a refractive index at 20° C. of 1.573 and a Gardner-Holt viscosity of $Z_5$–$Z_6$ (see Pat. Nos. 2,858,271 and 3,189,510).

The glass fiber herein employed is Johns-Manville CS–308 which had been chopped to ⅛" lengths. It has a diameter of approximately 0.0004 inch.

The A–1100 coupler is Union Carbide's γ-aminopropyltriethoxysilane.

The following procedure was used: The Epon resin, warmed to about 70° C., was gradually stirred into a slurry of the glass and water, which slurry had also been warmed to about 70° C. After all of the resin had been added the 4,4'-methylenedianiline (hereinafter referred to as MDA) was stirred into the warm mixture, and stirring at 70° C. was continued for an additional 30 minutes. This effected a partial cure, (B staging of the resin). The reaction mixture was then ice-cooled and water was decanted from the solids which formed. Water-washing and air-drying of the solids gave discrete, long grains which were hard and glossy. The individual grain consisted of a bundle of parallel, aligned or collimated fibers separated from each other by the resin. The bundle of fibers was completely enveloped by a coating of the resin. A 50 volume percent of glass fiber was determined by ignition of the grains.

The grains were extruded through a 2" length of a heated (ca. 135° C.), ⅛" I.D. tubular orifice at about 4000 p.s.i. The resulting strand was semi-flexible at room temperature and incompletely cured. Compression molding of a piece of the strand at 190° C. and 2000 p.s.i. for 30 minutes gave a hard, smooth test specimen having a flexural strength of 94,300 p.s.i. and a flexural modulus of 4,230,000 p.s.i. as determined by the procedure of American Society for Testing Materials (ASTM) Designation D–790–61 and a tensile strength of 27,800 p.s.i. as determined by ASTM Designation D–638–64T.

EXAMPLE 2

In this example a lower proportion of the same glass fiber was used than in Example 1. The following materials were employed:

| | G. |
|---|---|
| Epon 828 | 128.7 |
| MDA | 38.5 |
| Glass fiber, ⅛" lengths | 232.8 |
| A–1100 coupler | 2.33 |
| Water, 6000 ml. | |

The procedure of Example 1 was used to prepare the granules. These were then extruded through a 2" length of a heated (ca. 1355° C.), tapered orifice having a ½" I.D. circular inlet and a ⅛" I.D. exit. Compression molding of a portion of the resulting strand as in Example 1 gave a smooth, hard test specimen having a flexural strength of 66,000 p.s.i. and a flexural modulus of 3,100,000 p.s.i. employing the Example 1 ASTM test procedures.

EXAMPLE 3

This example shows the use of ¼" lengths of the glass fiber of Examples 1–2. The following materials were employed:

| | G. |
|---|---|
| Epon 828 | 49.9 |
| MDA | 14.9 |
| Glass fiber ¼" lengths | 135.2 |
| A–1100 emulsifier | 1.35 |
| Water, 4000 ml. | |

Using the procedure described in Example 1, there were obtained, clear, smooth grains, slightly over ¼" in length and about ⅛" thick at their thickest point. Extrusion to a strand and subsequent compression molding as described in Example 1 gave a test specimen having a flexural strength of 94,300 p.s.i. and a flexural modulus of 4,460,000 p.s.i., using the ASTM procedures of Example 1.

EXAMPLE 4

This example shows the use of very short glass fiber with soap surfactant in the preparation of a granular molding composition. The following materials were employed:

| | G. |
|---|---|
| Epon 828 | 300 |
| MDA | 90 |

|                              | G.    |
|------------------------------|-------|
| Potassium oleate             | ¹15   |
| Glass fiber                  | 561   |
| A-1100 coupler               | 1.68  |
| Water, 3000 ml.              |       |

¹ 300 ml. of a 5% solution.

The fiber was Owens-Corning glass fiber which had been milled and graded to approximately 0.015"–0.030" lengths. It had a diameter of about 0.4 ml. It was slurried in water containing the potassium oleate, the A-1100 coupler was added, and the mixture was warmed to 70° C. and held at that temperature for 10 minutes. Warm (80° C.) Epon 828 was then added to the warm slurry, and the resulting mixture was added to the MDA. The whole was then stirred at about 70° C. for 30 minutes and then ice-cooled. After washing the cooled mixture with water it was filtered, washed and air-dried to give smooth, hard grains. They were easily transfer molded. The grains were also readily extruded to a flexible, incompletely polymerized strand which could be compression molded as in Example 1.

EXAMPLE 5

This example shows the use of asbestos as a cullimating aid and of a cationic emulsifier in preparing a granular molding composition having a 45% by volume content of glass fibers. The following materials were used in the quantities shown below:

|                         | G.     |
|-------------------------|--------|
| Epon 828                | 125.8  |
| MDA                     | 37.8   |
| Glass fiber, ⅛" lengths | 230.8  |
| Avibest C               | 5.76   |
| Arquad 12-50 emulsifier | 4.91   |
| A-1100 coupler          | 2.31   |
| Water, 6000 ml.         |        |

The Avibest C used herein is a very short chrysotile asbestos fiber supplied by FMC Corporation. The average fiber length is less than 0.01 inch.

Arquad 12-50 is a cationic emulsifier supplied by Armour Chemical Company.

The glass fiber was Johns-Manville CS-308, described in Example 1.

The following procedure was used for preparing the granules: To water containing the Arquad 12-50 emulsifier there was first added the glass fiber, then the asbestos fiber, and then the A-1100 coupling agent. The resulting mixture was warmed to 70° C. and the Epon 828, which had been heated to the same temperature, was gradually added, with stirring. When all of the Epon had been added, the MDA was stirred into the whole, and stirring was continued at 70° C. for an additional 30 minutes. The reaction mixture was then rapidly cooled to 20° C., and water and excess, i.e., non-occluded, loosely suspended asbestos were decanted. The residual solids were water-washed and air-dryed over night at room temperature to obtain discrete, smooth grains having a continuous outer coating of the B-staged epoxy resin. The grains were silghtly longer than had been the length of the fibers, i.e., they had a length of slightly more than ⅛". Microscopic examination showed that each grain consisted of a plurality of glass fibers which were embedded in the resin in a neatly collimated or essentially parallel arrangement; that the fibers within the grain were not in contact with each other owing to the interposed resin; and that the resin also completely enveloped each grain to give a product wherein the ends of the fibers as well as the lengthwise surfaces thereof were coated with the resin. Ignition of the grains showed a 45% content of glass fiber by volume.

Some of the free-flowing granular product was transfer molded to give a smooth, hard molded object having a flexural strength of 60,400 p.s.i. and a flexural modulus of 2,150,000 p.s.i., as determined by the ASTM procedures of Example 1.

Another portion of the granular product was extruded through a heated (135–140° C.) ⅛" I.D., 2" long, straight orifice at a pressure of approximately 3000 p.s.i. A piece of the extruded straind was compression molded to a test specimen having a flexural strength of 71,000 p.s.i. and a flexural modulus of 3,300,000 p.s.i., as determined by the same ASTM methods.

EXAMPLE 6

Operating as in Example 5, but using the following quantities of the same materials, there was obtained a granular molding composition which was found, upon ignition, to have a glass fiber content of 40% by volume:

|                         | G.     |
|-------------------------|--------|
| Epon 828                | 119.1  |
| MDA                     | 35.7   |
| Glass fiber, ⅛" lengths | 140.4  |
| Avibest C               | 4.8    |
| Arquad 12-50 emulsifier | 4.5    |
| A-1100 coupler          | 1.41   |
| Water, 6000 ml.         |        |

Transfer molding of the free-flowing granular product as in Example 5 gave a molded test specimen having a flexural strength of 55,500 p.s.i. and a flexural modulus of 1,980,000 p.s.i. as determined by the same ASTM testing procedure.

Extrusion of the granular product to a flexible strand and compression molding of the extrudate as in Example 5 resulted in an increase of the flexural strength to 67,000 p.s.i. and of the flexural modulus to 2,900,000 p.s.i., as determined by the same procedure.

Here, even though both asbestos and emulsifier were used, the values are very close to those obtained in Example 1, wherein these adjuvants were not present, but where the granular product had a slightly higher content of the glass fiber.

EXAMPLE 7

This example shows use of ¼" lengths of glass fiber in a process using asbestos and an emulsifier. A granular molding composition having a 40% volume content of the glass fiber was obtained by operating as in Example 6 but using the same materials in the following quantities:

|                         | G.     |
|-------------------------|--------|
| Epon 828                | 163.9  |
| MDA                     | 49.3   |
| Glass fiber, ¼" lengths | 180.4  |
| A-1100 coupler          | 1.8    |
| Avibest C               | 6.4    |
| Arquad 12-50 emulsifier | 6.4    |
| Water, 6000 ml.         |        |

The resulting grains were slightly over ¼" in length, and were completely enveloped by resin. Microscopic examination showed collimation of fibers within the granule and interstitial presence of resin and short asbestos fibers, as in the case of granules which had been prepared from the ⅛" lengths of glass fiber.

Transfer molding of the present granules gave a molded test specimen having a flexural strength of 67,500 p.s.i. and a flexural modulus of 2,000,000 p.s.i., as determined by the same ASTM method. Extrusion of the granules to a flexible strand and subsequent compression molding as in Example 2 increased the flexural strength to 71,000 p.s.i. and the flexural modulus to 2,900,000 p.s.i. However, it is to be noted that these values are not so high as those obtained in Example 3 where neither the asbestos nor the emulsifier was used but where there was used a greater proportion of the same lengths of the same glass fiber.

EXAMPLE 8

This example shows the use of an anhydride curing agent plus an amine with a mixed epoxy system in the preparation of a granular molding composition comprising a resin-enveloped granule consisting of a plurality of the fibers in parallel arrangement and imbedded in and bonded together by the resin. The following materials were used:

|  | G. |
|---|---|
| Epon 828 | 16.8 |
| Epon 1031 | 16.8 |
| Methyl nadic anhydride | 30.2 |
| Benzyldimethylamine | 0.168 |
| Glass fiber, ⅛" lengths | 136 |
| A–1100 coupler | [1] 1.36 |
| Water, 4000 ml. | |

[1] 1% of the glass.

Epon 1031, supplied by Shell Chemical Company, is a liquid epoxy resin having an epoxide equivalent of between 2110–240, a Gardner-Holt viscosity of $Z_4$–$Z_6$, a bulk density of 40–45 lbs./ft.$^3$, and a molecular weight of 703. The Epon 828, the glass fiber, and the A–1100 coupler are described in Example 1. No surfactant was used. The glass fibers were stirred into the water, the A–1100 coupler was added, and the resulting slurry was warmed to 70° C. In a separate vessel the Epon 828, the Epon 1031, the methyl nadic anhydride and the benzyldimethylamine were mixed together and the mixture was heated to solution (at up to 100° C.). The resulting solution was added to the warmed (70° C.) slurry of glass fiber, and the whole was held at 80° C. for one hour. At the end of that time it was ice-cooled. Water was decanted from the resulting coagulate, and the remaining solids were washed with cold water and air dried. The resulting, pointed grains were golden-yellow and about ¼" in length.

The grains were extruded through an ⅛" I.D., 2" long, tubular orifice while maintaining an orifice temperature of 105° C. an oil pressure of 600 p.s.i., and a velocity of 2"/second. There was thus obtained a flexible pre-preg in strand form. A piece of the strand was compression molded at 190° C. and 500 p.s.i. to give a hard, well-dimensioned test specimen having a flexural strength of 46,000 p.s.i., a flexural modulus of 5,560,000, and a 72.6% by volume content, determined by ignition, of glass fiber. Some resin squeeze-out was noted during molding. The extremely high modulus and the low flexural strength may be ascribed to the high content of glass in the present granules.

EXAMPLE 9

This example shows the use of graphite fibers. The following materials were employed:

|  | G. |
|---|---|
| Epon 828 | 51.4 |
| MDA | 15.3 |
| Arquad 12–50 emulsifier | 2.0 |
| Graphite fiber (ca. ¼" lengths) | 33.3 |
| A–1100 coupler | 0.33 |
| Water, 4000 ml. | |

The graphite fiber is Thornel 25, manufactured by Union Carbide Corporation. It was chopped and graded for the present purpose to approximately ¼" lengths. The fiber was first added to water containing the emulsifier, then the A–1100 coupler was stirred in, and the resulting slurry was warmed to 70° C. Warm (70° C.) Epon 828 was then added and finally the MDA. Stirring was continued at 70° C. for an additional 30 minutes to obtain B-staging of the resin. Rapid ice-cooling, decanting of the water from the resulting coagulate, water-washing of the residual solids, and subsequent air-drying gave the encapsulated graphite. Extrusion through a heated (135° C.) 2" long, ⅛" I.D. circular orifice and compression molding of a piece of the resulting strand gave a hard, smooth test specimen having a flexural modulus of 3,600,000 p.s.i. as determined by the ASTM procedures of Example 1.

EXAMPLE 10

This example shows the use of a mixture of glass fibers with graphite fibers in the preparation of a granular molding composition. The following materials were used:

|  | G. |
|---|---|
| Epon 828 | 37.0 |
| MDA | 11.0 |
| Graphite fiber, ca. ¼" lengths | 18.7 |
| Glass fiber, ⅛" lengths | 33.3 |
| Arquad 12–50 emulsifier | 1.44 |
| A–1100 coupler | 0.52 |
| Water, 4000 ml. | |

The graphite fiber is described in Example 9, the glass fiber is Johns-Manville CS 308, described in Example 1.

Operating as in Example 9, gave upon extrusion to a flexible strand and subsequent compression molding, a hard, smooth test bar having a flexural strength of 56,000 p.s.i., and a flexural modulus of 3,580,000 (ASTM procedures of Example 1).

EXAMPLE 11

This example shows the use of a commercial (Carborundum Corporation) grade of silicon carbide whiskers, wherein only about 10% by volume of the material consisted of filaments having a length of at least 30 microns, with the balance being more finely comminuted, particulate material. The following materials were used:

|  | G. |
|---|---|
| Epon 828 | 18.0 |
| MDA | 5.4 |
| Silicon carbide whiskers (see above) | 26.6 |
| Arquad 12–50 emulsifier | 0.94 |
| A–1100 coupler | 0.10 |
| Water, ca. 700 ml. | |

A suspension of the above-described silicon carbide in 500 ml. of water containing the emulsifier was stirred in the Waring Blendor in order to break up lumps; owing to the resulting foam, an additional quantity of water (ca. 200 ml.) was added to defoam the mixture. It was then warmed to 70° C. and to the warm slurry there was added a warm mixture obtained by mixing the Epon resin with the MDA at 90° C. The whole was stirred for 30 minutes at 70° C. and cooled with ice. After decanting, the residual solid was water-washed and air-dried to give a product which consisted in part of small, rice-shaped grains, about 5 mils long and about 0.8 mil thick, in which the silicon carbide whiskers were collimated. However, much of the product consisted of ball-like aggregates having a diameter of about 10 mils. The entire dried product was readily transfer-molded to give a hard, smooth bar having a flexural strength of 29,300 p.s.i. and a flexural modulus of 1,800,000 p.s.i., as determined by the ASTM procedures of Example 1. The present process thus provides a means of preparing valuable shaped objects by flow molding a composition obtained by using a filler consisting of even a very small proportion of silicon carbide whiskers.

EXAMPLE 12

This example shows the use of silicon nitride whiskers. The following materials were employed:

|  | G. |
|---|---|
| Epon 828 | 10.0 |
| MDA | 3.0 |
| Arquad 12–50 emulsifier | 0.5 |
| Silicon nitride whiskers | 23.1 |
| A–1100 coupler | 0.46 |
| Water, 1250 ml. | |

The silicon nitride whiskers had a length of from 50–200 microns. They were dispersed in the water by means of a Waring Blendor. The coupler was then added and the mixture was warmed to 70° C. before adding the emulsifier. The resin and MDA were then added at 90° C. and the whole was stirred for 30 minutes at 70° C. The reaction mixture was then cooled, filtered, washed, and dried. A portion (12 g.) of the dry product was then thoroughly mixed with 7.2 g. of a warm (ca. 90° C.) 1:0.3 mixture of Epon 828 and MDA and the resulting mixture was compression molded at 135° C./300-400 p.s.i. There was thus obtained a hard, well-dimensioned test bar having a flexural strength of 23,800 p.s.i. and a flexural modulus of 3,000,000 p.s.i., as determined by the ASTM procedures of Example 1.

EXAMPLE 13

This example shows use of long asbestos fibers as filler. The following materials were employed:

|  | G. |
|---|---|
| Epon 828 | 16.1 |
| MDA | 4.85 |
| Crocidolite asbestos fiber | 29.1 |
| Avibest C | 0.25 |
| Arquad 12-50 emulsifier | 0.63 |
| A-1100 coupler | 0.29 |

Water, 1000 ml.

The crocidolite asbestos was wet-screened previous to use in order to remove non-fibrous material. It was herein employed in about ⅛" lengths. Avibest C, a very short chrysotile fiber, is described in Example 5. As in Examples 5–7 and 17–18, it is used here as a collimating agent. Operating substantially as in Example 5, there were obtained dry, hard grains, about ⅜" long, wherein the crocidolite fiber was collimated along the length of the grain and the short chrysotile fiber was occluded in the interstitial resin.

Compression molding of the grains gave a smooth laminate having a flexural modulus of 2,900,000 p.s.i., as determined by the ASTM procedure of Example 1. The grains likewise gave a smooth well-dimensioned object when transfer-molded at 135° C. at up to 300 p.s.i.

EXAMPLE 14

This example shows use of stainless steel fibers. The following materials were employed:

|  | G. |
|---|---|
| Epon 828 | 50 |
| MDA | 15 |
| Potassium oleate | 2.5 |
| Stainless steel fibers | 106 |

Water, 1000 ml.

The fibers were 304 stainless steel, having a length of about 30 mils and a diameter of about 12 microns.

They were cleaned, prior to use, by slurrying in 1000 ml. of water containing 25 ml. of concentrated nitric acid, repeatedly water-washing to neutrality, washing 3 times with acetone and 3 times with hexane, and air drying at room temperature.

The fibers were slurried with the water plus potassium oleate, the slurry was warmed to 70° C., warm (ca. 80° C.), Epon 828 was stirred in gradually, and finally the MDA was added. After stirring for 30 minutes at 70° C. the mixture was rapidly cooled, water was decanted, and the residue was water-washed and air-dried to give smooth grains. Microscopic examination showed striking orientation of the fibers.

EXAMPLE 15

This example shows the preparation and evaluation of a granular molding composition comprising collimated boron/tungsten fibers.

The following materials were employed in the indicated quantities:

|  | G. |
|---|---|
| Epon 828 | 8.4 |
| MDA | 2.5 |
| Arquad 12-50 emulsifier | 0.33 |
| Boron/tungsten fiber, ⅛" lengths | 34.7 |
| Attapulgus clay | 4.5 |
| A-1100 coupler | 0.39 |

Water, 2000 ml.

The fiber, having a diameter of 1.5 mil, had been formed by vapor phase deposition of boron upon a tungsten filament to give a ca. 0.5 mil coating of the boron. The A-1100 coupler is described in Example 1, and Arquad 12-50 emulsifier in Example 5.

The granular composition was prepared by adding the fiber, the clay, and the A-1100 coupler to water containing the Arquad 12-50 emulsifier, warming the resulting slurry to about 70° C., adding warm Epon 828 to the slurry, stirring in the MDA, maintaining the whole at about 70° C. for 30 minutes with continuous stirring, and finally rapidly cooling the mixture. Upon decanting the water, washing the residual solid with water and air-drying of the washed solid there were obtained discrete, hard grains having pointed ends and consisting of a plurality of the fibers in parallel arrangement and imbedded in and bonded together and completely enveloped by the resin. The grains were slightly longer than the ⅛" long fibers contained therein. A 50% content of boron/tungsten fiber was determined by ignition.

The granular product was extruded to a flexible strand through a heated (ca. 135° C.), 3/16" I.D., 2" long, tubular orifice at about 800 p.s.i. Compression molding of a piece of the strand for 1.5 hours at 190° C. and 2000 p.s.i. and subsequent curing at 150° C. for 30 minutes gave a test specimen having a flexural strength of 75,000 p.s.i. and a flexural modulus of 16,700,000 p.s.i., as determined by the ASTM procedures of Example 1.

EXAMPLE 16

This example is like Example 15, except a smaller proportion of the same fiber was used.

The following materials were employed in the indicated quantities:

|  | G. |
|---|---|
| Epon 828 | 12.1 |
| MDA | 3.6 |
| Araquad 12-50 emulsifier | 0.48 |
| Boron/tungsten fiber | 28.8 |
| Attapulgus clay | 5.4 |
| A-1100 coupler | 0.58 |

Water, 2000 ml.

Proceeding as in Example 15, there were obtained ¼"–⅜" long, smooth, pointed grains in which the fiber was neatly collimated and in which substantially all of the clay had been co-encapsulated. A 35% by volume content of the boron/tungsten fiber was determined by ignition. The grains extruded easily through the heated 3/16" I.D., 2" long tubular orifice, as in Example 15. However, compression molding of the resulting strand gave a test specimen which did not have the very high flexural strength and modulus of the molded object of Example 15; i.e., the flexural strength in this case was reduced to 59,800 p.s.i. and the modulus to 11,900,000 p.s.i., as determined by the same procedure.

These results show that filler loading is of extreme importance in obtaining high-strength, boron/filled composites. However, direct compression molding of the present grains (eliminating the extrusion step) gave a molded product having a flexural strength of only 50,200 p.s.i. and a flexural modulus of only 5,700,000 p.s.i., as determined by the ASTM procedures of Example 1.

This shows that valuable orientation and overlap of fiber is obtained by extruding through the tubular orifice.

EXAMPLE 17

In this example the boron/tungsten fiber of Examples 15 and 16 was used with very short asbestos fiber, rather than with attapulgus clay.

The following materials were used in the indicated quantities:

|  | G. |
|---|---|
| Epon 828 | 12.2 |
| MDA | 3.65 |
| Boron/tungsten fiber, ⅛" lengths | 28.8 |
| Avibest C | 5.5 |
| Arquad 12-50 emulsifier | 0.158 |
| A-1100 coupler | 0.576 |

Water, 2000 ml.

The Avibest C and the procedure employed for preparing the granules are described in Example 5.

There were thus obtained smooth, hard grains, about 0.5 inch in length, and having a 46% by volume content of the boron/tungsten fiber, by ignition. The grains were readily compression molded to give a smooth, hard, well-dimensioned molded object having a flexural strength of 66,000 p.s.i. and a flexural modulus of 14,900,000 p.s.i., as determined by the ASTM procedures of Example 1.

EXAMPLE 18

This example shows use in preparation of a granular molding composition of heavier, longer pieces of boron/tungsten fibers than those used in Examples 15-17. In the present instance the fibers had a thickness of 4 mils and consisted of boron on a 0.5 mil tungsten substrate. They had been chopped and graded to ¼" lengths.

The following materials were used for preparing the granules:

|  | G. |
|---|---|
| Epon 828 | 16.1 |
| MDA | 4.83 |
| Boron/tungsten fibers (see above) | 21.8 |
| Avibest C | 7.25 |
| Arquad 12-50 emulsifier | 0.36 |
| A-1100 coupler | 0.44 |

Water, 1000 ml.

The Avibest C and the procedure were those used in Example 5.

There were obtained hard, smooth grains, approximately ½" in length. They were laid, substantially lengthwise in a 4" x ¼" mold and compression molded to give a test bar having a flexural strength of 56,000 p.s.i. and a flexural modulus of 12,800,000 p.s.i. as determined by the ASTM procedures of Example 1.

It is to be understood that although the invention has been described with specific reference to particular embodiments thereof, it is not to be so limited since changes and alterations therein may be made which are within the full intended scope of this invention.

What we claim is:

1. The method of preparing a molding composition in grain form which method comprises preparing an aqueous slurry containing from about 0.05 to about 10% by volume reinforcing fibers having a length of from about 0.03 to about 1.0 inch, stirring into the slurry a thermosettable resin and a curing agent therefor at a temperature at which the reson is liquid, said resin being added to said slurry in a quantity sufficient to provide a mixture of resin plus fiber containing from about 25 to about 80% by volume fiber, continuing the stirring until the resin is advanced to the B-stage, rapidly cooling the resulting reaction mixture, removing the water, and drying the residue.

2. The method defined in claim 1, further limited in that the resin is an epoxide resin.

3. The method defined in claim 1, further limited in that the fiber has an aspect ratio of from 100 to 1000.

4. The method defined in claim 1, further limited in that the fiber is glass.

5. The method defined in claim 1, further limited in that the fiber is a refractory material.

6. The method defined in claim 1, further limited in that a surfactant is present in the slurry.

7. The method defined in claim 1, further limited in that a coupling agent is added to the slurry previous to introduction of said resin.

8. The method of preparing a matrix-filler molding composition in grain form which method comprises preparing a slurry of a mixture of fillers consisting essentially of from about 99.5% to 60% of a reinforcing fiber having a length of from about 0.03 inch to about 1.0 inch and an aspect ratio of from about 100 to 1000, said fiber being present in said slurry in an amount from about 0.05 to about 10% by volume, and particulate filler having a maximum linear dimension of less than 0.03 inch, stirring into the slurry a thermosettable resin and a curing agent therefor at a temperature at which the resin is liquid, said resin being added to said slurry in a quantity sufficient to provide a mixture of resin plus fiber containing about 25 to about 80% by volume fiber, continuing the stirring until the resin is advanced to the B-stage, rapidly cooling the resulting reaction mixture, removing the water, and drying the residue.

9. The method defined in claim 8, further limited in that said fiber is boron/tungsten.

10. The method defined in claim 8, further limited in that said fiber is boron/tungsten and said particulate filler is clay.

11. The method defined in claim 8, further limited in that said fiber is boron/tungsten and said particulate filler is asbestos.

References Cited

UNITED STATES PATENTS

| 3,003,911 | 10/1961 | Lindstrom et al. | 117—100 S |
| 3,265,644 | 8/1966 | Herman et al. | 117—100 S |
| 3,518,221 | 6/1970 | Kenyon et al. | 260—37 Ep |

LEWIS T. JACOBS, Primary Examiner

U.S. Cl. X.R.

260—38, 40 R